US011979077B2

United States Patent
Yoda et al.

(10) Patent No.: US 11,979,077 B2
(45) Date of Patent: May 7, 2024

(54) MOTOR STATOR AND METHOD FOR MANUFACTURING MOTOR STATOR

(71) Applicant: SANYO DENKI CO., LTD., Tokyo (JP)

(72) Inventors: Yasushi Yoda, Tokyo (JP); Kouji Nakatake, Tokyo (JP); Syogo Yoda, Tokyo (JP)

(73) Assignee: SANYO DENKI CO., LTD., Tokyo (JP)

( * ) Notice: Subject to any disclaimer, the term of this patent is extended or adjusted under 35 U.S.C. 154(b) by 238 days.

(21) Appl. No.: 17/554,567

(22) Filed: Dec. 17, 2021

(65) Prior Publication Data

US 2022/0209621 A1 Jun. 30, 2022

(30) Foreign Application Priority Data

Dec. 25, 2020 (JP) .................................. 2020-216799

(51) Int. Cl.
| | |
|---|---|
| *H02K 3/34* | (2006.01) |
| *H02K 1/14* | (2006.01) |
| *H02K 3/18* | (2006.01) |
| *H02K 3/28* | (2006.01) |
| *H02K 3/32* | (2006.01) |
| *H02K 3/52* | (2006.01) |
| *H02K 5/22* | (2006.01) |

(52) U.S. Cl.
CPC .............. *H02K 5/225* (2013.01); *H02K 1/146* (2013.01); *H02K 1/148* (2013.01); *H02K 3/18* (2013.01); *H02K 3/28* (2013.01); *H02K 3/325* (2013.01); *H02K 3/522* (2013.01); *H02K 2203/06* (2013.01)

(58) Field of Classification Search
CPC .............................. H02K 3/34; H02K 2203/06
See application file for complete search history.

(56) References Cited

FOREIGN PATENT DOCUMENTS

| | | |
|---|---|---|
| JP | H02-083644 U | 6/1990 |
| JP | 2008-278636 A | 11/2008 |
| KR | 20050052010 A * | 6/2005 |

OTHER PUBLICATIONS

Japanese Office Action (JPOA) mailed on Nov. 16, 2023 for the corresponding Japanese Patent Application No. 2020-216799.

* cited by examiner

*Primary Examiner* — Ramon M Barrera
(74) *Attorney, Agent, or Firm* — RANKIN, HILL & CLARK LLP (57) ABSTRACT

Provided is a motor stator which includes: a ring-shaped stator core; a plurality of tooth portions protruding inward from the stator core; an insulator made of an insulating material and mounted on the plurality of tooth portions; a stator coil wound around each of the plurality of tooth portions via the insulator; a lead wire; and a connection portion connecting the stator coil and the lead wire, in which the insulator includes a connection housing portion housing the connection portion.

5 Claims, 6 Drawing Sheets

ND METHOD FOR
MOTOR STATOR AND METHOD FOR MANUFACTURING MOTOR STATOR

CROSS-REFERENCE TO RELATED APPLICATION

This application claims priority from Japanese Patent Application No. 2020-216799 filed with the Japan Patent Office on Dec. 25, 2020, the entire content of which is hereby incorporated by reference.

BACKGROUND

1. Technical Field

The present disclosure relates to a motor stator and a method for manufacturing a motor stator.

2. Related Art

A motor stator is conventionally provided with a coil connection portion where a lead wire and one end of a coil of each phase are connected. The coil connection portion is fixed to the motor stator with insulation secured. A method that houses the coil connection portion in housing space provided to an insulator of the motor stator and fixes the coil connection portion with an adhesive is known as a method for fixing the coil connection portion.

Figure 8A:
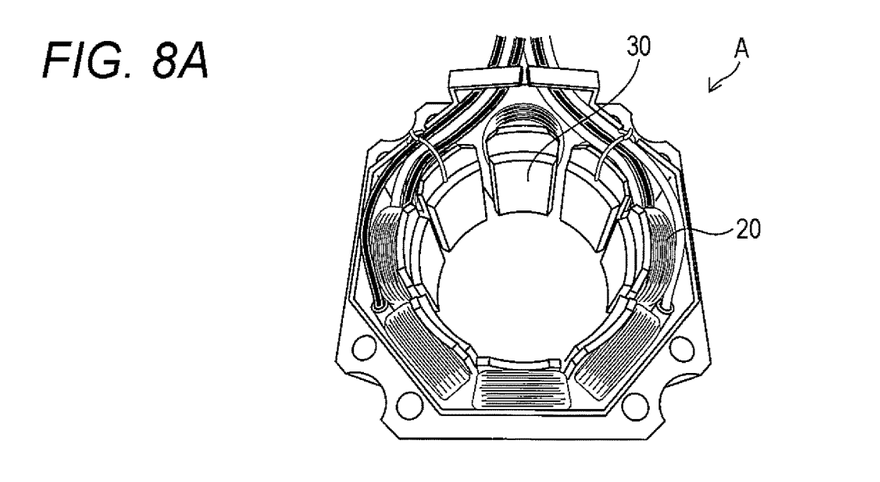
FIGS. 8A to 8D are diagrams illustrating the structure of a known motor stator.
Figure 8B:
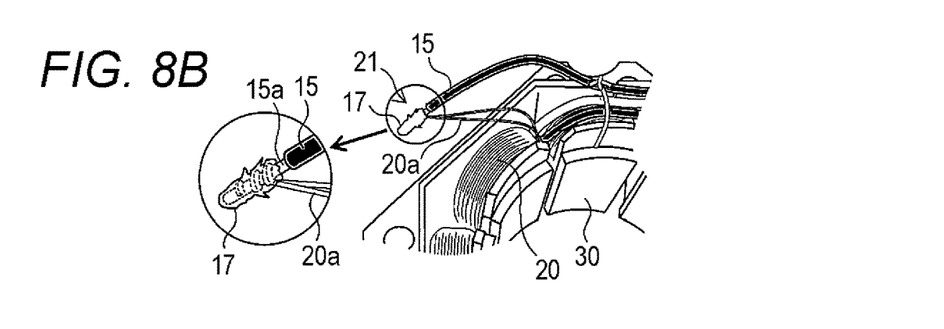
Figure 8C:
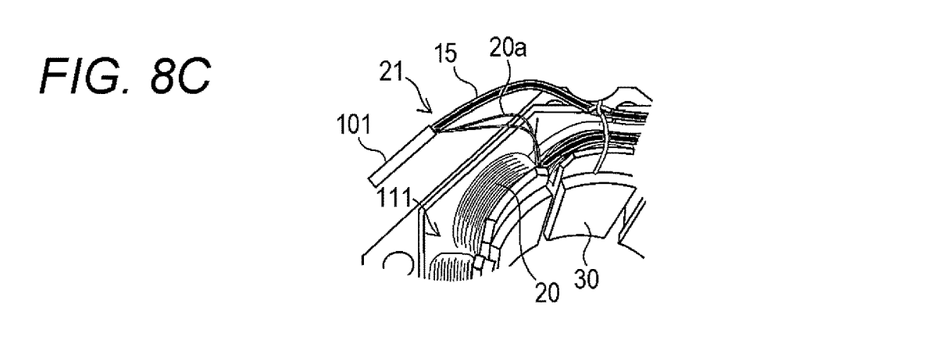
Figure 8D:
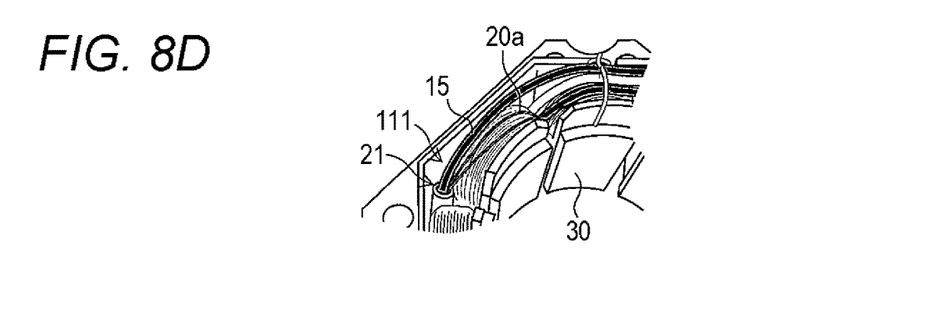

For example, a method is known which mounts a resin insulator 30 on a motor stator (FIG. 8A), and forms a coil connection portion (connection portion) 21 where a wound magnet wire (coil) 20 and a lead wire 15 (more specifically, a lead wire core 15a, which is referred to below as the "lead wire 15") are connected (FIGS. 8B to 8D) as illustrated in FIGS. 8A to 8D. When the coil connection portion 21 is formed, a magnet wire (coil) 20a is wrapped around and soldered to the lead wire 15 first (FIG. 8B). Next, a heat-shrinkable tube 101 is fitted on the coil connection portion 21 and then shrunk to insulate the coil connection portion 21 (FIG. 8C). The coil connection portion 21 is then inserted into a gap 111 created between wound portions of a plurality of the adjacent magnet wires (coils) 20a, and, for example, an adhesive material such as varnish is subsequently filled and applied in the gap 111. As a result, the coil connection portion is fixed to the stator (FIG. 8D). This is the known structure.

SUMMARY

A motor stator according to an embodiment of the present disclosure is configured to include: a ring-shaped stator core; a plurality of tooth portions protruding inward from the stator core; an insulator made of an insulating material and mounted on the plurality of tooth portions; a stator coil wound around each of the plurality of tooth portions via the insulator; a lead wire; and a connection portion connecting the stator coil and the lead wire, in which the insulator includes a connection housing portion housing the connection portion.

BRIEF DESCRIPTION OF THE DRAWINGS

FIGS. 1A and 1B are perspective views illustrating an example of a motor to which a motor stator according to an embodiment of the present disclosure can be applied, FIG. 1A is a diagram of when a stator coil is wound after a connection housing portion is withdrawn to a position that does not hinder the path of movement of the stator coil during winding, and FIG. 1B is a diagram of after the connection housing portion is folded and fixed in such a manner as to be returned to a position at an end of a slot of a stator core in the axial direction;

DETAILED DESCRIPTION

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In such a known motor stator, for example, what is called an "icicle-like portion" that is a form of solder 17 resulting from forming a peak tends to appear during soldering (refer to FIG. 8B). As a result, for example, the "icicle-like portion" may damage and break a heat-shrinkable tube that covers the coil connection portion and form a faulty insulated portion in the coil connection portion.

Moreover, if a varnishing process or the like is performed to fix the coil connection portion that has been inserted in a slot portion, it is necessary to perform the step of drying varnish or the like after the process. The drying step takes time. Therefore, the manufacturing time and the number of man-hours are increased.

Furthermore, the gap created between the wound portions of the plurality of the adjacent magnet wires (coils), the gap for inserting the coil connection portion, may not be able to be secured to a sufficient degree, depending on the space factor and wound state of the winding. Alternatively, the gap may result in having a shape that has the difficulty of allowing the insertion of the coil connection portion. As a result, it becomes difficult to insert the coil connection portion.

Moreover, a heat-shrinkable tube is required to insulate the coil connection portion. Therefore, the number of components and the number of man-hours may be increased.

An object of the present disclosure is to provide a motor stator for solving such various problems.

A motor stator according to an embodiment of the present disclosure includes: a ring-shaped stator core; a plurality of tooth portions protruding inward from the stator core; an insulator made of an insulating material and mounted on the plurality of tooth portions; a stator coil wound around each of the plurality of tooth portions via the insulator; a lead wire; and a connection portion connecting the stator coil and the lead wire. The insulator includes a connection housing portion housing the connection portion.

It is preferred that the insulator includes the connection housing portion via a hinge portion.

It is preferred that the connection housing portion includes a hole portion for inserting and housing the connection portion in at least one of surfaces of the connection housing portion.

It is preferred that the insulator includes an edge on each of an inner and an outer side thereof, and includes a connection housing portion fixing portion that fixes the connection housing portion to the inner edge of the insulator.

It is preferred that the connection housing portion is molded integrally with the insulator.

A method for manufacturing a motor stator according to an embodiment of the present disclosure includes the steps of: molding an insulator made of an insulating material integrally with a connection housing portion that houses a connection portion that connects a stator coil and a lead wire; mounting the insulator on a plurality of tooth portions protruding inward from a ring-shaped stator core; upon the stator coil being wound, withdrawing the connection housing portion from a position at an end, in a motor rotary shaft direction, of a slot located between the tooth portions to a position that does not hinder the path of movement of the stator coil during winding; winding the stator coil via the insulator; twisting an end of the stator coil and an end of the lead wire together and forming the connection portion; molding and fixing the connection housing portion in such a manner as to return the connection housing portion to the position at the end of the slot in the motor rotary shaft direction; and inserting and housing the connection portion in an opening of a hole portion formed in a surface that is on the front side of the connection housing portion upon the connection housing portion being folded and fixed.

At least the order of the step of twisting the ends of the stator coil and the lead wire together and forming the connection portion, and the step of folding and fixing the connection housing portion in such a manner as to return the connection housing portion to the position at the end of the slot in the axis direction is not limited to the above order, and the steps may be performed in reverse order.

An object of the present disclosure is to provide a motor stator that can perform a winding operation as in before while solving the above-mentioned problems such as the formation of the faulty insulated portion, the increases of the manufacturing time and the number of man-hours, the difficulty of inserting the coil connection portion, and the increase of the number of components.

Moreover, in the motor stator according to the present disclosure, the connection housing portion bridges and fixes a part between the inner and outer peripheries of the insulator. Hence, the motor stator according to the present disclosure has a significant effect that can not only increase the stiffness of the insulator but also prevent the displacement of the wound coil in the axial direction of a motor.

In the specification, the direction in which a rotation axis C of the motor points is defined as the Z axis, the up and down directions in the Z-axis direction on the drawings are defined as "up" and "down" unless otherwise specified. The definitions are for convenience of description, and do not limit the placement direction itself of, for example, the motor.

Moreover, in the following description, the radial direction centered on the rotation axis C of the motor that extends in the Z-axis direction is simply referred to as the "radial direction," and the direction of the circumference formed by an arbitrary circle centered on the rotation axis C of the motor, that is, the direction around the rotation axis C of the motor (a θZ direction) is simply referred to as the "circumferential direction" unless otherwise specified. The Z-axis direction, which is the direction in which the rotation axis C of the motor points, is simply referred to as the "axial direction." Moreover, the Z-axis direction may be referred to as the "up-and-down direction," or the "direction of the rotary shaft of the motor."

A motor stator according to one embodiment of the present disclosure is described hereinafter with reference to the drawings.

Figure 1A:
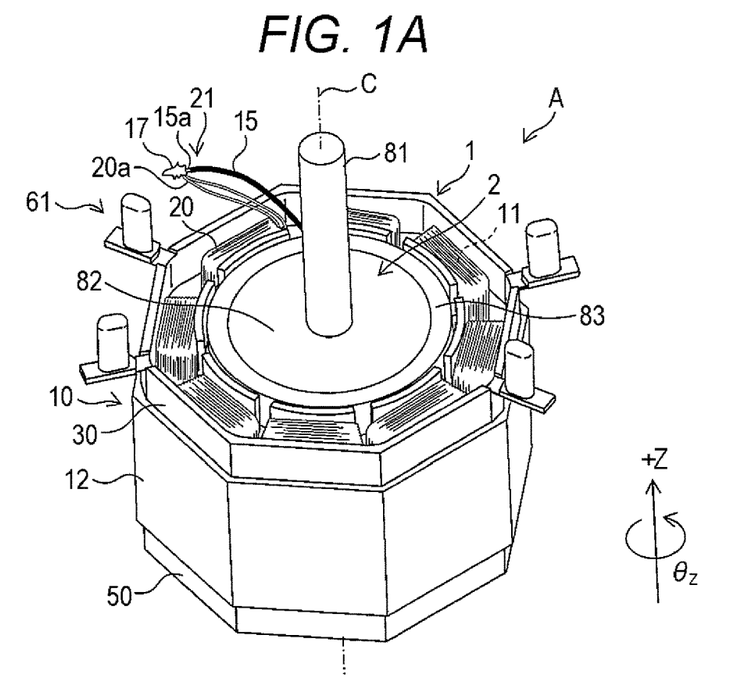
Figure 1B:
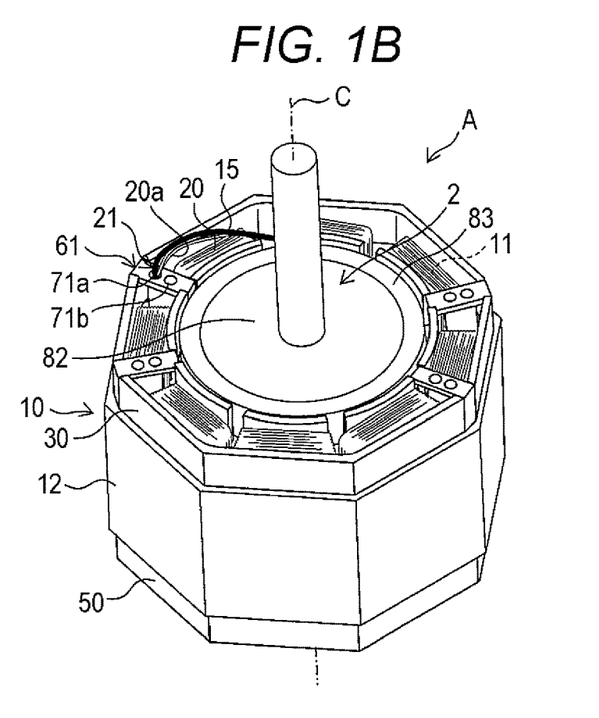
Figure 2:
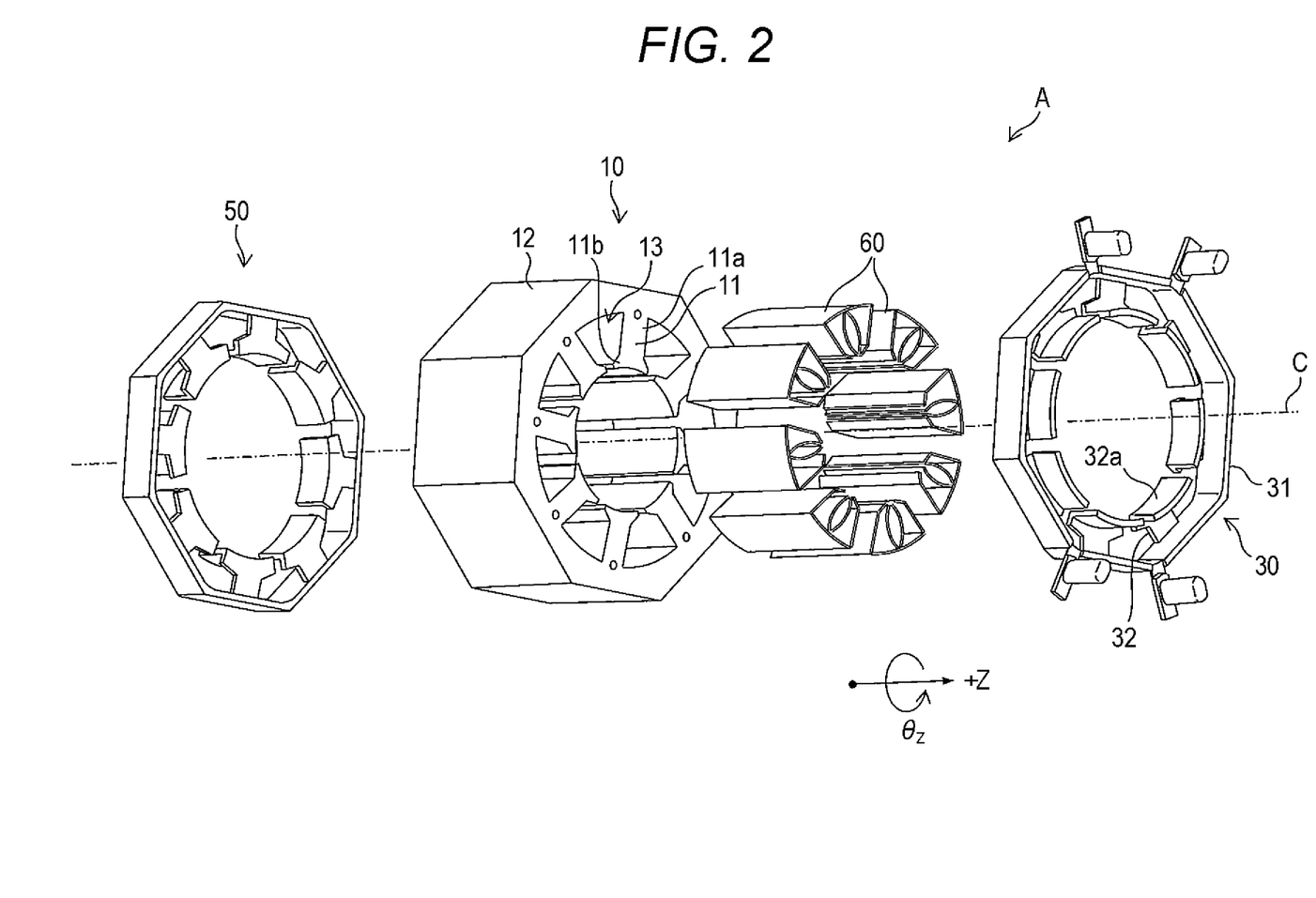
FIG. 2 is an exploded perspective view of the motor stator according to the embodiment.

FIGS. 1A and 1B are perspective views illustrating an example of a motor to which the motor stator according to the embodiment can be applied. FIG. 1A is a diagram of when a stator coil is wound after a connection housing portion described below is withdrawn to a position that does not hinder the path of movement of the stator coil during winding. FIG. 1B is a diagram of after the connection housing portion is folded and fixed in such a manner as to be returned to a position at an end of a slot in the axial direction. FIG. 2 is an exploded perspective view of the motor stator according to the embodiment.

Figure 3:
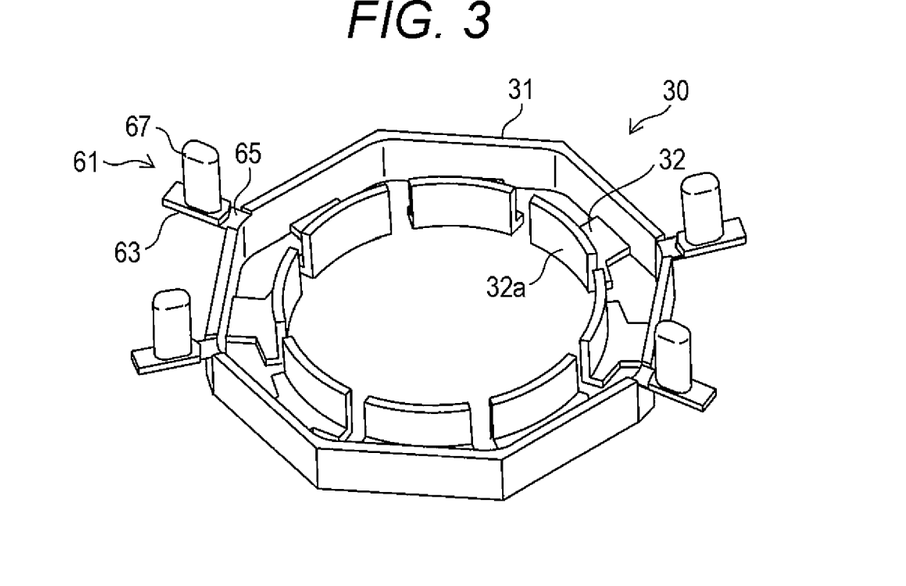
FIG. 3 is a perspective view illustrating an example of the structure of an insulator according to the embodiment.
Figure 4:
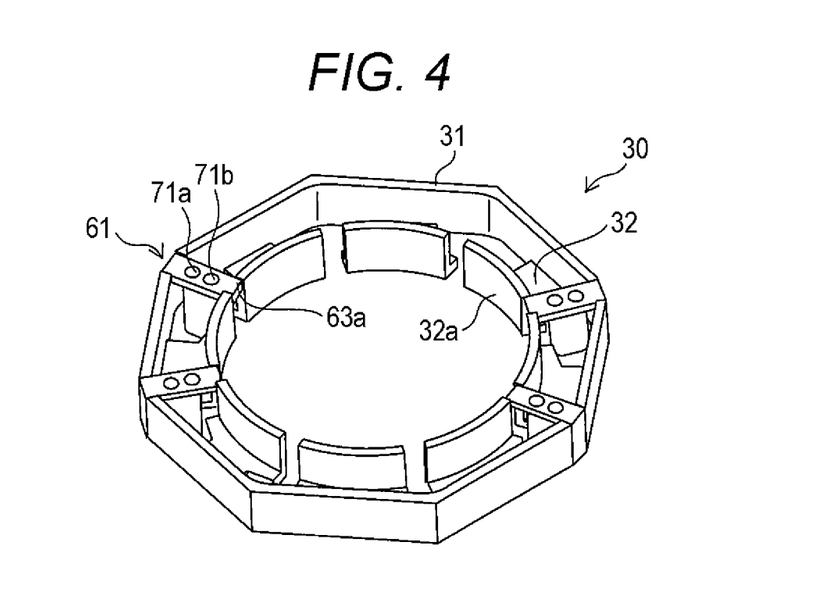
FIG. 4 is a perspective view illustrating an example of the structure of the insulator according to the embodiment.
Figure 5:
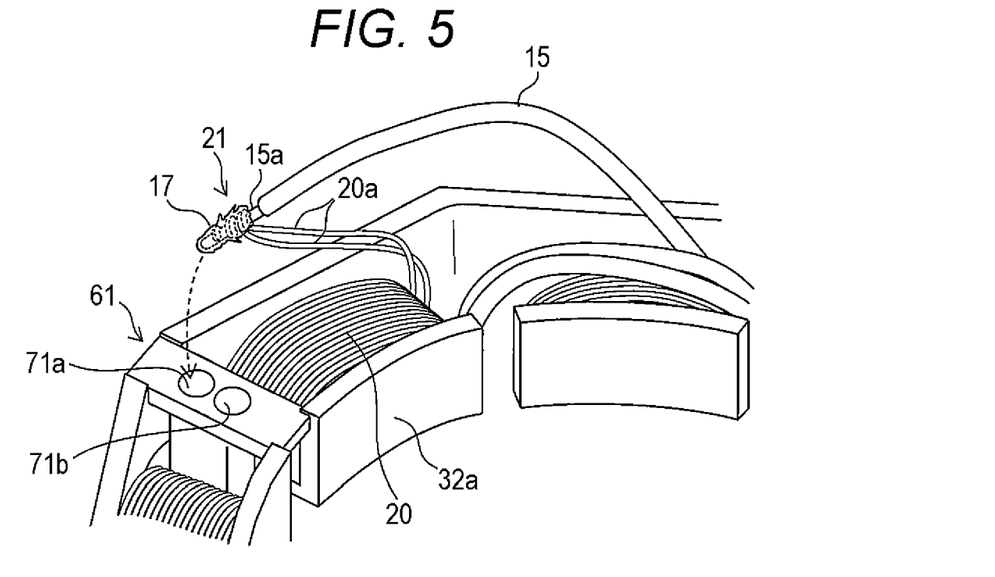
FIG. 5 is a perspective view illustrating an example of the structure of the insulator and a connection portion according to the embodiment.
Figure 6:
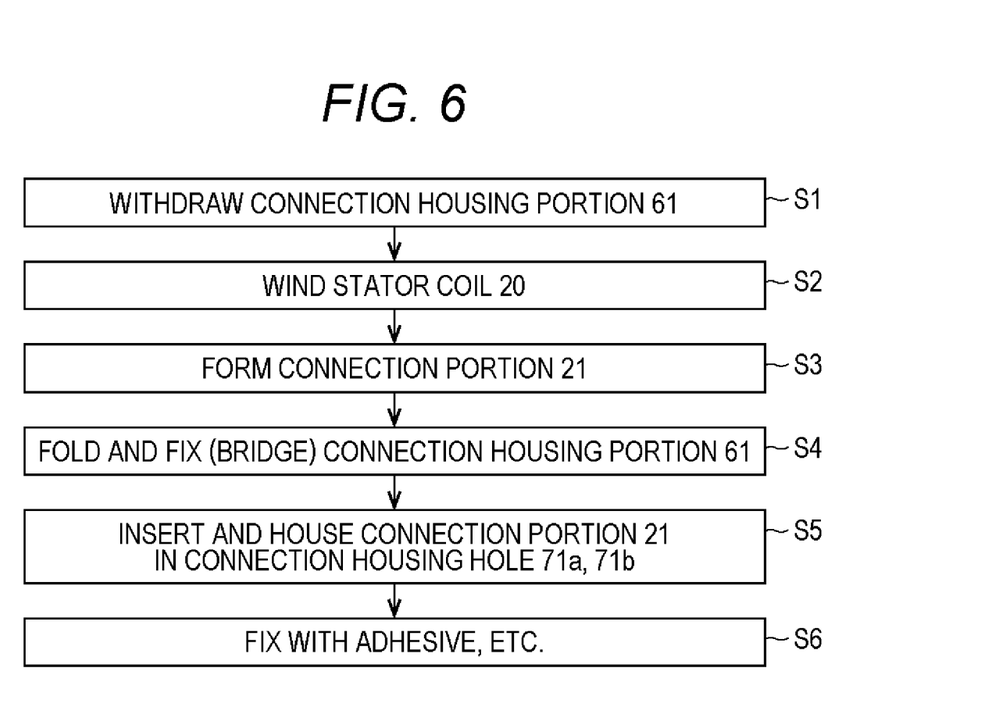
FIG. 6 is a flowchart diagram illustrating the flow of steps of a method for manufacturing a motor stator according to the embodiment.
Figure 7A:
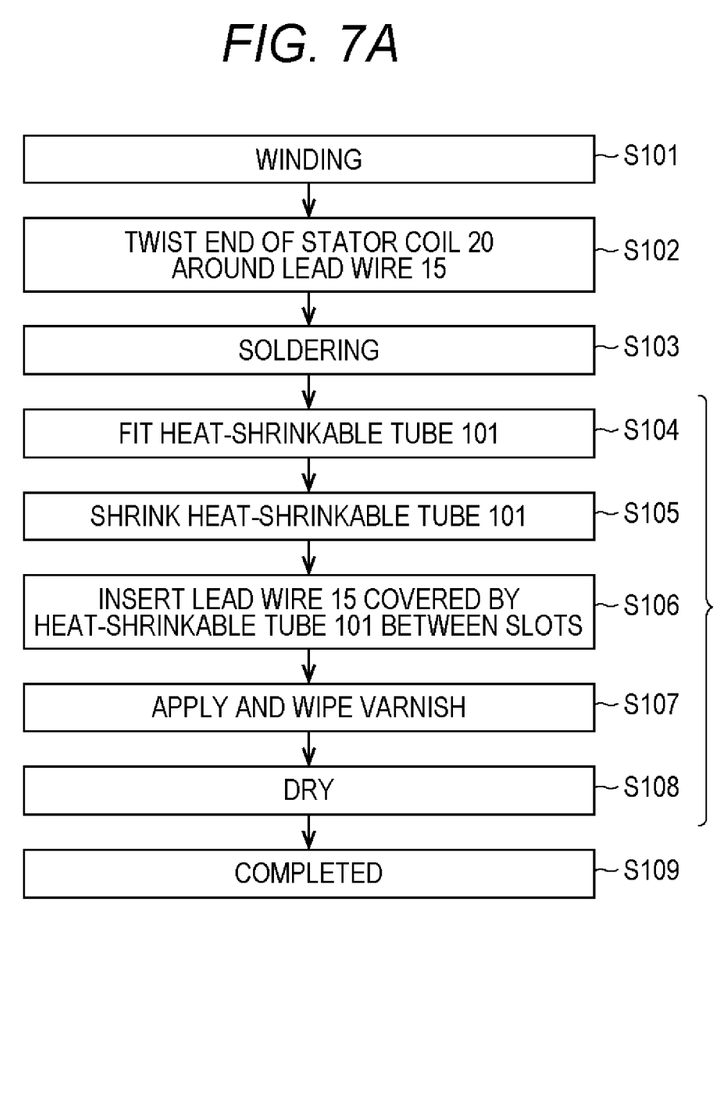
FIG. 7A is a flowchart diagram of steps of a known method for manufacturing a motor stator.
Figure 7B:
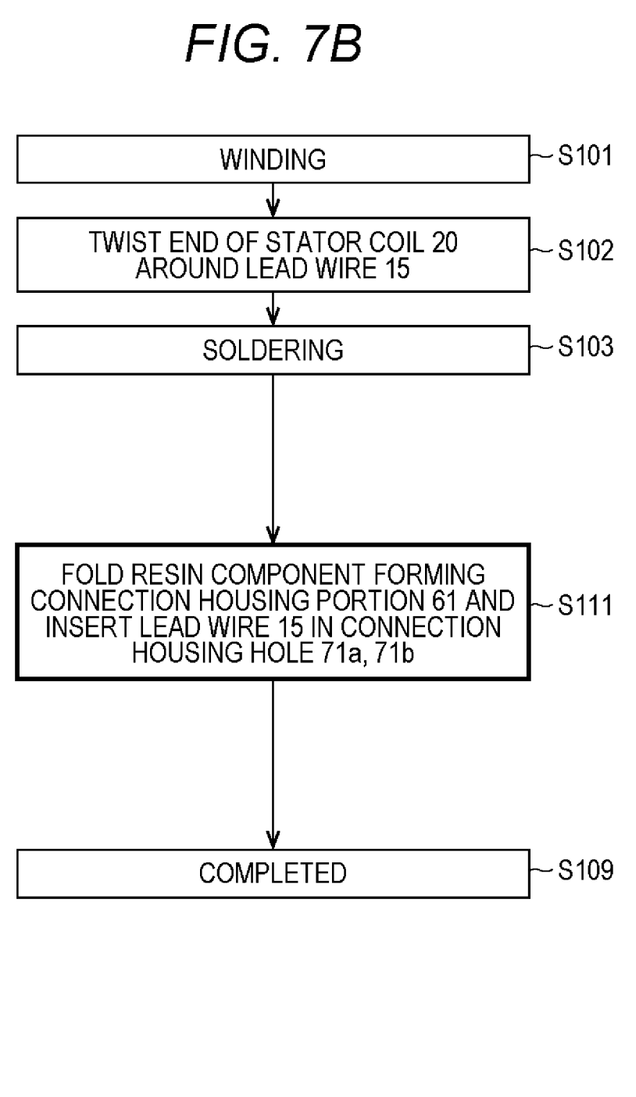
FIG. 7B is a flowchart diagram of the method for manufacturing a motor stator according to the embodiment.

Moreover, FIGS. 3 and 4 are perspective views illustrating an example of the structure of an insulator to which the motor stator according to the embodiment is applied. FIG. 5 is a perspective view illustrating an example of the structure of the insulator and a connection portion according to the embodiment. Moreover, FIG. 6 is a flowchart diagram illustrating the flow of steps of a method for manufacturing a motor stator according to the embodiment. FIG. 7A is a flowchart diagram of a known method for manufacturing a motor stator. FIG. 7B is a flowchart diagram of the method for manufacturing a motor stator according to the embodiment.

As illustrated in FIGS. 1A to 3, a motor A according to the embodiment includes a substantially cylindrical motor stator 1, and a rotor 2 that is placed radially inward of the motor stator 1. The rotor 2 includes a rotary shaft 81.

The rotor 2 has a circular cylindrical shape centered on the rotation axis C that extends in the axial direction (the Z-axis direction). The rotary shaft 81 is supported in such a manner as to be rotatable about the axis by an unillustrated bearing.

A rotor core 82 is a laminate formed by laminating silicon steel plates, surrounds the rotary shaft 81 around the axis, and is fixed to the rotary shaft 81.

A rotor magnet 83 is fixed to the outer surface of the rotor core 82 around the axis.

As illustrated in FIGS. 1A, 1B, and 2, the motor stator 1 of the motor A includes a ring-shaped stator core (iron core) 10, an upper insulator 30, a lower insulator 50, a slot insulator 60, stator coils 20, and a lead wire 15.

The stator core 10 includes a cylindrical yoke portion 12 that is concentric with the rotation axis C, and a plurality of tooth portions 11 that extends radially inward from the yoke portion 12.

The stator core 10 is provided with a plurality of slots 13. The slot 13 has an air gap surrounded by side surfaces (surfaces crossing a tangent line in the circumferential direction) of two tooth portions 11 that are adjacent to each other in the circumferential direction, and by the inner surface of the yoke portion 12. The slot insulator 60 is stored in the slots 13.

The plurality of tooth portions 11 is placed adjacently, equally spaced in the circumferential direction, and protrudes inward from the ring-shaped stator core 10. The upper insulator 30, the lower insulator 50, and the slot insulator 60 are attached to the tooth portions 11. The stator coil 20 to be wound on the stator core 10 is wrapped via the slot insulator 60, that is, on the slot insulator 60.

Each tooth portion 11 includes a tooth body portion 11a extending inward from the yoke portion 12, and a tooth tip portion 11b located at the inner end of the tooth body portion 11a.

The embodiment can be safely applied to both of the upper insulator 30 and the lower insulator 50. In the following description, an example where the embodiment is applied to the upper insulator 30 is described in detail. The upper insulator 30 includes an outer wall portion 31 provided on the outer side, a plurality of protruding portions 32 that protrudes from the outer wall portion 31 and extends inward, and end wall portions 32a formed at the inner ends of the protruding portions 32. The plurality of tooth portions 11 each includes the stator coil 20 wound on the stator core 10 via the upper insulator 30. More specifically, the stator coil 20 is formed by wrapping a winding 20a on the protruding portion 32 of the upper insulator 30. Moreover, in the embodiment, the example where the insulator includes three split parts is illustrated. However, the present disclosure does not depend on the insulator structure. For example, the insulator may include two split parts. In this case, for example, it may be designed to form a single insulator including two split insulator structures by integrating: an insulator structure where the upper insulator 30 and the first half of the slot insulator 60 are integrated; and an insulator structure where the lower insulator 50 and the second half of the slot insulator 60 are integrated. Moreover, any insulator structure, for example, the slot insulator 60 is further split, can also be adopted.

The winding 20a is wrapped around in a plurality of turns between the outer wall portion 31 and the end wall portion 32a of the protruding portion 32 on the upper insulator 30 according to the embodiment. As a result, the stator coil 20 is formed.

The winding 20a can be wound in the slots 13 by use of, for example, a nozzle after the upper insulator 30 and at least the slot insulator 60 are inserted into the stator core 10.

As illustrated in FIG. 5, two portions of the stator coil 20 from which insulation has been removed, and a core 15a of the lead wire 15 are connected. In other words, a connection is made in such a manner as to wrap the winding 20a of the stator coil 20 around the core 15a of the lead wire 15 and then fixed with solder 17. As a result, a connection portion 21 is formed. The connection configuration of the stator coil 20 and the number of the stator coils 20 that are connected in parallel can be selected as appropriate. Moreover, the connection portion 21 can be similarly formed with any number of phases, regardless of the number of phases, that is, a single phase or three phases.

(Structure of Connection Housing Portion)

The structure of a connection housing portion 61 is described below.

A plurality of the connection housing portions 61 is provided in any places on the outer wall portion 31 of the upper insulator 30. In FIGS. 3 and 4, four connection housing portions 61 are provided in four places on the outer wall portion 31. The places where the connection housing portions 61 are provided are not limited to these places. The connection housing portions 61 are simply required to be formed in places where the connection portions can be easily provided, considering the lead wire 15 and the winding 20a of the stator coil 20, depending on the motor configuration.

The connection housing portion 61 is configured in such a manner as to, when the winding 20a is wound around to form the stator coil 20, be withdrawn from a position at an end of the slot 13 in the axial direction to a position that does not hinder the path of movement of the winding 20a during winding. The connection housing portion 61 is configured in such a manner as to be attached and fixed to the outer edge of the upper insulator 30 via a hinge portion 65 that is folded and fixed in such a manner as to be returned to the position at the end of the slot 13 in the axial direction after the winding 20a is wound around. The above "axial direction" is the direction of the rotation axis C of the motor (the Z-axis direction). In other words, the position at the end of the slot 13 in the axial direction indicates a position at an end of the slot 13 in the direction of the rotation axis C of the motor. In FIG. 1B, the connection housing portion 61 is located at a position at an end of the slot 13 in a +Z direction.

The connection housing portion 61 can be formed by being molded integrally with the upper insulator 30. For example, the connection housing portion 61 includes a plate-shaped member 63 provided to the outer wall portion 31, the plate-shaped member 63 having the hinge portion 65 that is formed in such a manner as to be foldable inward from the outer wall portion 31 of the upper insulator 30, and a tubular portion 67 provided in a rotation direction of the plate-shaped member 63. The plate-shaped member 63 has a connection housing portion fixing portion 63a. The connection housing portion fixing portion 63a is engaged in a notch formed in the end wall portion 32a of the upper insulator 30. As a result, the connection housing portion 61 can be fixed.

In the above configuration, the upper insulator 30 has an edge on each of the inner and outer sides. When the connection housing portion 61 is folded and fixed, the connection housing portion 61 is fixed to the upper insulator 30 by the connection housing portion fixing portion 63a at the inner edge of the upper insulator 30.

The tubular portion 67 includes, for example, two connection housing holes 71a and 71b that are continuous from, for example, two openings formed in the plate-shaped member 63. The connection portion 21 can be inserted through the connection housing hole 71a or 71b. The connection portion 21 may be fixed with, for example, an adhesive in the connection housing hole 71a or 71b.

Moreover, the structure of the insides of the connection housing holes 71a and 71b is arbitrary, and another fixing means can be arbitrarily used as a means for preventing the connection portion 21 from coming out of the connection housing holes 71a and 71b. For example, the diameter of the connection housing holes 71a and 71b is made slightly smaller than the diameter of the connection portion 21. Consequently, mechanical resistance to insertion and removal can be added to the connection portion 21. Moreover, it is possible to previously fill photo-curable resin in the connection housing hole 71a or 71b before inserting the connection portion 21.

At least one of the upper, lower, and side surfaces of the connection housing portion 61 is simply required to have the connection housing holes 71a and 71b for inserting and housing the connection portion 21.

(Method for Manufacturing Motor Stator)

An example of a method for manufacturing a motor stator according to the embodiment is described with reference to the flowchart diagram of FIG. 6.

(1) The connection housing portion 61 is withdrawn from the position at the end of the slot 13 in the axial direction to a position that does not hinder, for example, the path of movement of the winding 20*a* during winding and the arm of a winding apparatus (step S1).

(2) In this state, the winding 20*a* is wound on the slot insulator 60 by a known method to form the stator coil 20 (step S2).

(3) In this stage, the portion of the winding 20*a* from which insulation has been removed, and the core 15*a* of the lead wire 15 are connected in such a manner as to wrap the winding 20*a* around the core 15*a* of the lead wire 15. As a result, the connection portion 21 is formed (step S3). In conjunction with this, soldering may be performed. Step S3 and the next step S4 may be performed in reverse order.

(4) The hinge portion 65 is bent and folded in such a manner as to return the connection housing portion 61 to the position at the end of the slot 13 in the axial direction, and the connection housing portion 61 is fixed (bridged) to the inner edge of the upper insulator 30 (step S4).

(5) The connection portion 21 where the winding 20*a* of the stator coil 20 and the lead wire are twisted together is inserted and housed in at least one of the two connection housing holes 71*a* and 71*b* formed in a surface that is on the front side (the upper surface in FIGS. 4 and 5) of the connection housing portion 61 located in the slot 13 of the stator core 10 in the state after step S4 (step S5).

(6) The connection portion 21 is fixed with, for example, an adhesive in the connection housing hole 71*a* or 71*b* (step S6).

FIG. 7A is a flowchart diagram of steps of the known method for manufacturing a motor stator. FIG. 7B is a flowchart diagram of the method for manufacturing a motor stator according to the embodiment.

In the known manufacturing method, the winding step (step S101), the step of twisting the end of the winding 20*a* of the stator coil 20 around the lead wire 15 (step S102), the step of wrapping the end of the stator coil around the lead wire 15 and soldering the end to the lead wire 15 (step S103), the step of fitting a heat-shrinkable tube (step S104), the step of shrinking the heat-shrinkable tube (step S105), the step of inserting the lead wire 15 between the slots (step S106), the step of applying and wiping varnish (step S107), and the drying step (step S108) are performed. A motor stator is then completed (step S109).

On the other hand, in the manufacturing method according to the embodiment, the motor stator 1 can be completed (step S109) simply by performing the step of folding the resin component forming the connection housing portion 61 and inserting and housing the lead wire 15 in the connection housing hole 71*a* or 71*b* (step S111) after steps S101 to S103.

The configuration and manufacturing method according to the embodiment allows easily fixing the connection portion 21. Moreover, the connection portion 21 is fixed in the hole portion provided in the resin material forming the upper insulator 30 of the motor stator 1 without using a heat-shrinkable tube. Therefore, for example, insulation failure hardly occurs in the connection portion 21.

Furthermore, the connection housing holes 71*a* and 71*b* are formed integrally with the upper insulator 30 of the motor stator 1, which brings the advantage of a reduction in the number of components.

The embodiment illustrates the example where the winding 20*a* and the lead wire 15 are interlaced and twisted together to form the connection portion 21. However, the method for forming the connection portion 21 and the structure of the connection portion 21 are not necessarily limited to this example.

According to the embodiment, instead of the heat-shrinkable tube used for insulation, the connection housing portion 61, which is the resin component molded integrally with the upper insulator 30, is used as an insulating component of the connection portion 21. The connection housing portion 61 is free from concerns of breakage unlike the heat-shrinkable tube. Moreover, the connection housing portion 61 is integral with the upper insulator 30. Therefore, the connection portion 21 and the upper insulator 30 can be fixed simply by folding the connection housing portion 61 inward and inserting the connection housing portion 61 into the slot 13. Hence, the varnishing process for fixing is not required. Therefore, the working time and the number of man-hours can be dramatically reduced.

Moreover, the configurations and the like are not limited to those illustrated in the above embodiment. The configurations and the like illustrated in the above embodiment can be modified as appropriate within the scope where the effects of the present disclosure are exerted. In addition, a modification can be made as appropriate unless the modification departs from the scope of the object of the present disclosure.

Furthermore, in the above embodiment, the connection housing portion 61 has the structure that couples the outer and inner peripheries of the upper insulator 30, which makes it possible to increase the stiffness of the upper insulator 30 and reduce the displacement of the stator coil 20 in the axial direction.

For example, the embodiment illustrates the example where the connection housing portion is provided to the upper insulator 30. However, the connection housing portion may be provided to the lower insulator 50, or to each of the upper insulator 30 and the lower insulator 50.

Moreover, each constituent element of the present disclosure can be freely selected. The present disclosure includes a disclosure including the selected configuration.

The present disclosure can be used for a motor stator.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A motor stator comprising:
    a ring-shaped stator core;
    a plurality of tooth portions protruding inward from the stator core;
    an insulator made of an insulating material and mounted on the plurality of tooth portions;
    a stator coil wound around each of the plurality of tooth portions via the insulator;
    a lead wire; and
    a connection portion connecting the stator coil and the lead wire, wherein
    the insulator includes a connection housing portion housing the connection portion, and
    the insulator includes the connection housing portion via a hinge portion.

2. The motor stator according to claim 1, wherein the connection housing portion includes a hole portion for inserting and housing the connection portion in at least one of surfaces of the connection housing portion.

3. The motor stator according to claim 1, wherein the insulator
   includes an edge on each of an inner and an outer side thereof, and
   includes a connection housing portion fixing portion that fixes the connection housing portion to the inner edge of the insulator.

4. The motor stator according to claim 1, wherein the connection housing portion is molded integrally with the insulator.

5. A method for manufacturing a motor stator, comprising the steps of:
   molding an insulator made of an insulating material integrally with a connection housing portion that houses a connection portion that connects a stator coil and a lead wire;
   mounting the insulator on a plurality of tooth portions protruding inward from a ring-shaped stator core;
   upon the stator coil being wound, withdrawing the connection housing portion from a position at an end, in a motor rotary shaft direction, of a slot located between the tooth portions to a position that does not hinder the path of movement of the stator coil during winding;
   winding the stator coil via the insulator;
   twisting an end of the stator coil and an end of the lead wire together and forming the connection portion;
   folding and fixing the connection housing portion in such a manner as to return the connection housing portion to the position at the end of the slot in the motor rotary shaft direction; and
   inserting and housing the connection portion in an opening of a hole portion formed in a surface that is on the front side of the connection housing portion upon the connection housing portion being folded and fixed.

* * * * *